(12) United States Patent
Stein

(10) Patent No.: US 6,423,215 B1
(45) Date of Patent: Jul. 23, 2002

(54) FLUID FILTER UNIT WITH AUTOMATIC CLOGGED FILTER ELEMENT BYPASS AND FERROUS INDICATOR FLAG

(76) Inventor: Myron Stein, 31412 Flying Cloud Dr., Laguna Niguel, CA (US) 92677

( * ) Notice: Subject to any disclaimer, the term of this patent is extended or adjusted under 35 U.S.C. 154(b) by 0 days.

(21) Appl. No.: 09/801,936

(22) Filed: Mar. 8, 2001

(51) Int. Cl.⁷ .............................................. B01D 35/06
(52) U.S. Cl. ........................ 210/131; 210/132; 210/90; 210/91; 210/223; 210/446
(58) Field of Search .............................. 210/85, 90, 91, 210/131, 132, 223, 446, 695; 137/540; 123/196 A

(56) References Cited

U.S. PATENT DOCUMENTS

| | | | |
|---|---|---|---|
| 3,421,627 A | * 1/1969 | Lammers | |
| 3,591,003 A | 7/1971 | Cooper | 210/90 |
| 3,817,380 A | 6/1974 | Brown | 210/131 |
| 3,819,052 A | 6/1974 | Firth | 210/90 |
| 4,082,665 A | * 4/1978 | Schneider et al. | |
| 4,166,792 A | 9/1979 | Offer et al. | 210/131 |
| 4,439,984 A | 4/1984 | Martin | 60/454 |
| 4,689,144 A | 8/1987 | Holmes | 210/130 |
| 4,961,846 A | 10/1990 | Isakson | 210/131 |

* cited by examiner

Primary Examiner—Joseph W. Drodge
Assistant Examiner—Terry K. Cecil
(74) Attorney, Agent, or Firm—Womble Carlyle Sandridge & Rice, PLLC

(57) ABSTRACT

A filter unit for coupling in-line with a transmission fluid line is provided for filtering ferrous and non-ferrous particulate matter from the transmission fluid. The filter unit includes a filter element 21 situated within a casing 12. The filter unit has an annular magnet 26 mounted on an end thereof. In an operational condition, the magnet is seated against an inner surface of the casing. As the filter becomes clogged, the filter element moves to a bypass position unseating the magnet from the casing. Fluid then bypasses the filter element but still flows around the magnet which continues to attract and trap ferrous particulate matter. A ferrous indicator flag 49 may be positioned on the outside of the casing when the filter element is in its operational position and is released and falls away as a visual indication of a clogged filter element in the bypass position.

23 Claims, 2 Drawing Sheets

FLUID FILTER UNIT WITH AUTOMATIC CLOGGED FILTER ELEMENT BYPASS AND FERROUS INDICATOR FLAG

TECHNICAL FIELD

This invention relates generally to fluid filters and more particularly to filters for automotive fluids such as transmission fluids and to such filters with automatic clogged filter element bypass functionality. The invention also relates to indicator flags for indicting a clogged or failure condition in filters, conduits, and the like.

BACKGROUND

Automatic transmissions in modern vehicles are at least partially filled with automatic transmission fluid, which lubricates and cools the transmission and provides hydrostatic coupling between the engine and the driven wheels. In most cases, the automatic transmission fluid is circulated through a fluid flow conduit from the transmission, to a radiator, and back to the transmission to cool the fluid and prevent the transmission from overheating. Over time, small particles or flecks of ferrous metal tend to become suspended in the transmission fluid as a result of the normal wear and tear on internal working components of the transmission. Non-ferrous particles such as particles of aluminum, plastic, or dirt also can become suspended in the transmission fluid. These ferrous and non-ferrous particles become entrained in the transmission fluid as it circulates and, if not removed, can cause serious damage to the transmission as a result of their abrasive action on moving internal components thereof.

In order to remove particulates from automatic transmission fluid, transmissions are provided with filters. As the transmission fluid is circulated, it passes through these filters, which presumably trap and remove the particles from the fluid. One example of an automatic transmission fluid filter for removing ferrous and non ferrous particles from the fluid is disclosed in U.S. Pat. No. 4,689,144 of Holmes. The Holmes filter is an in-line filter unit that includes a cylindrical casing within which a cylindrical filter element is disposed. The casing has an inlet end provided with an inlet port and an outlet end provided with an outlet port and is coupled in-line with a transmission fluid circulation conduit, the transmission fluid passing through the filter unit as it circulates. An annular or donut shaped magnet is disposed at the inlet end of the casing and the transmission fluid flows through the central opening of the magnet and into the interior of the filter element through its porous outside wall before passing out of the housing through a spigot disposed in the filter element. In theory, ferrous particles entrained within the fluid are attracted to the magnet as the fluid flows through and around the magnet and non-ferrous particles are trapped by the filter medium of the filter element. In this way, the transmission fluid is continuously filtered to remove both ferrous and non-ferrous particles as the fluid is circulated during operation of the transmission.

Occasionally, the filter elements of in-line filters such as the filter unit disclosed in Holmes become clogged with trapped particles and fluid flow through the filter unit can become constricted. In order to prevent this situation from interrupting the circulation of transmission fluid, which can ruin or render inoperative the transmission, transmission fluid filters are provided with bypass functions. In Holmes, for instance, a pressure relief valve is mounted in the end of the filter element adjacent the inlet end of the casing. If the fluid pressure increases due to a clogged filter element, the pressure relief valve opens to allow transmission fluid to flow directly into the filter casing and out through the spigot and outlet port without passing through the clogged filter medium of the element. While this clearly eliminates the filtering function of the filter element, it nevertheless allows transmission fluid to continue to circulate and the transmission to continue to operate. The fluid still passes through the annular magnet, however, so that ferrous particles, in theory, are still removed from the fluid. In other in-line fluid filters, such as that disclosed in U.S. Pat. No. 4,166,792 of Offer et al., increased fluid pressure as a result of a clogged filter element causes the filter element itself to move within the casing against a biasing spring to allow the fluid to flow directly around and bypass the clogged element.

In prior art transmission fluid filters, the magnets that remove ferrous particles from the fluid are fixed within the filter casings. As a result, the surface area of the magnet to which the fluid is exposed when the filter element becomes clogged and the unit is in bypass mode is relatively small. Furthermore, in filter units where the filter element itself moves away from the magnet when clogged to provide fluid bypass, the force of the fluid against the now exposed open end of the filter element can cause turbulence. This turbulence, in turn, can stir up and disturb trapped particles within the clogged filter element, which become re-entrained in the fluid flow and can cause damage to a transmission. Finally, it has been observed that the bypass function of in-line filters is only gradually activated as the filter elements of the filters slowly become clogged. This can contribute to the stirring up of trapped particles in the clogged filter as a result of fluid turbulence. Thus, prior art automatic transmission fluid filters have not proven to be complete solutions to the problems of filtering particles from circulating transmission fluid while at the same time insuring that fluid circulation is not affected when the filter elements of the filters become clogged.

A need exists, therefore, for an in-line automatic transmission fluid filter that traps ferrous and non-ferrous particles entrained within the fluid as the fluid circulates and that provides effective bypass of the filter element when the element becomes clogged. More specifically, a clogged condition of the filter element should result in an immediate complete bypass condition rather than a gradual transition to the bypass condition in order to eliminate the stirring up of particles within the clogged filter element by fluid turbulence. When in a bypass condition, fluid flowing through the filter should be exposed to a clean and relative large magnet surface area to insure the continued removal of ferrous particles from the fluid even when the filter element is bypassed. Finally, fluid turbulence at the mouth of and within the clogged fluid filter during a bypass condition should be minimized, again to minimize or eliminate the stirring up and re-entraining of particles in the fluid. A further need exists for a reliable and simple means of indicating visually when the filter is clogged so that it can be replaced with a fresh filter. Indeed, a need exists in general for reliable and simple indicator flag systems for indicating visually a failure condition in various types of systems including a restricted flow through a fluid flow conduit or spent battery acid in an automotive battery. It is to the provision of such an in-line filter unit and to such indicator flags that the present invention is primarily directed.

SUMMARY OF THE INVENTION

Briefly described, the present invention, in a preferred embodiment thereof, comprises a filter unit for removing ferrous and non-ferrous particles from a flow of fluid through a fluid flow conduit. The filter unit includes a generally cylindrical casing having a diameter, an inlet end formed with a fluid inlet port, and an outlet end formed with a fluid outlet port. The inlet and outlet ports, which may be of the quick-disconnect type, are adapted for coupling the casing in-line with the fluid flow conduit so that fluid flows through the casing from its inlet end to its outlet end.

A generally cylindrical filter element has a diameter smaller than the diameter of the casing and is disposed within the filter casing. The filter element has a first end formed with an opening and being located adjacent the inlet end of the casing and a second end located adjacent the outlet end of the casing. A generally annular magnet having an outside diameter smaller than the diameter of the casing is mounted to the first end of the filter element. The magnet is formed with an opening substantially aligned with the opening formed in the first end of the filter element.

The filter element is movable within the casing between an operational position wherein the magnet is seated against the inlet end of the casing for fluid flow through the opening in the magnet and into the filter element, and a bypass position wherein the magnet is displaced from the inlet end of the casing for fluid flow around the magnet and around the filter element. A spring may be disposed in the casing, preferably between the second end of the filter element and the outlet end of the casing, for yieldably biasing the filter element to its operational position during normal operation of the filter unit. Alternatively, the spring may be eliminated and the inlet end of the filter casing formed of a ferrous material. In such an embodiment, the filter element is held in its seated position against the inlet end of the casing by magnetic attraction between the magnet on the end of the filter element and the ferrous inlet end of the casing.

During normal operation, fluid passes through the opening in the magnet, into the filter element through its open end, through the filter media that forms the sides of the filter element, and out of the filter unit through the outlet port. The magnet attracts and removes from the fluid any small ferrous particles that may be entrained in the fluid and the filter element filters and removes non-ferrous particles from the fluid.

When the filter element becomes clogged, the resulting fluid pressure moves the filter element to its bypass position, wherein the magnet is displaced from the inlet end of the casing. In this bypass condition, fluid is allowed to bypass the clogged filter element while continuing to pass over and around the magnet. Thus, the magnet continues to attract and trap ferrous particles within the fluid. In addition, the surface of the magnet presented to the fluid is clean and of substantially greater area than the interior surface surrounding the central opening of the magnet. Thus, removal of ferrous particles in the bypass mode is enhanced and continues even though non-ferrous particles are not being filtered by the filter element. Further, the opening of the magnet helps prevent turbulence in the fluid from stirring up and dislodging particles previously trapped within the filter element. Periodic inspection will reveal the clogged condition of the filter element and the filter unit can be replaced with a fresh unit easily as a result of the quick disconnect inlet and outlet ports.

A horseshoe or other shaped ferrous indicator flag may be provided for indicating when the filter unit is operating normally and when it is clogged. More specifically, the indicator flag, which may be colored orange or another bright color, is position on the exterior of the casing in the region where the magnet of the filter element resides when the filter is operating normally. So long as the filter element is in its normal position within the casing, the magnet remains in this region and, since the indicator flag is ferrous, holds the indicator flag to the exterior of the casing by magnetic attraction. However, when the filter element becomes clogged and moves to its bypass position as discussed above, the magnet moves down with the filter and away from the region where the indicator flag is located. When this happens, the indicator flag simply falls away from the exterior of the casing. This, the absence of an indicator flag serves as a visual indication that the filter unit is clogged and requires replacement. The indicator flag also may be configured to cover a bright colored strip or bright words such as "replace filter element." In such an embodiment, when the flag falls away from the exterior of the casing, it reveals the strip or words as a more vivid indicator that replacement of the filter unit is required. This magnetic indicator flag technology also may be applied to other systems to, for example, indicate when battery acid in a battery is spent and the battery requires replacement or to indicate when fluid flow through a conduit is below or above established limits. Finally, a hall effect or magnetic reed switch may be used in place of a ferrous indicator flag with the switch connected to activate an indicator light within the vehicle when a clogged or failure condition occurs.

Accordingly, a filter unit, particularly suited for filtering automatic transmission fluid, is now provided that successfully addresses the problems and shortcomings of the prior art. More specifically, in normal operation, the unit traps ferrous and non-ferrous particles and removes them from the fluid flow. When the filter becomes clogged, the unit reverts to a bypass condition, in which ferrous particles are still removed efficiently and in which turbulence that might otherwise dislodge trapped particles from the clogged filter and re-entrain them in the fluid is greatly reduced. The unit is easily replacable with a fresh unit because of its quick disconnect inlet and outlet ports. The ferrous indicator flag provides a simple and reliable visual indication of a clogged condition of the filter unit so that replacement can be made promptly. These and other features, objects, and advantages of the filter unit of this invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
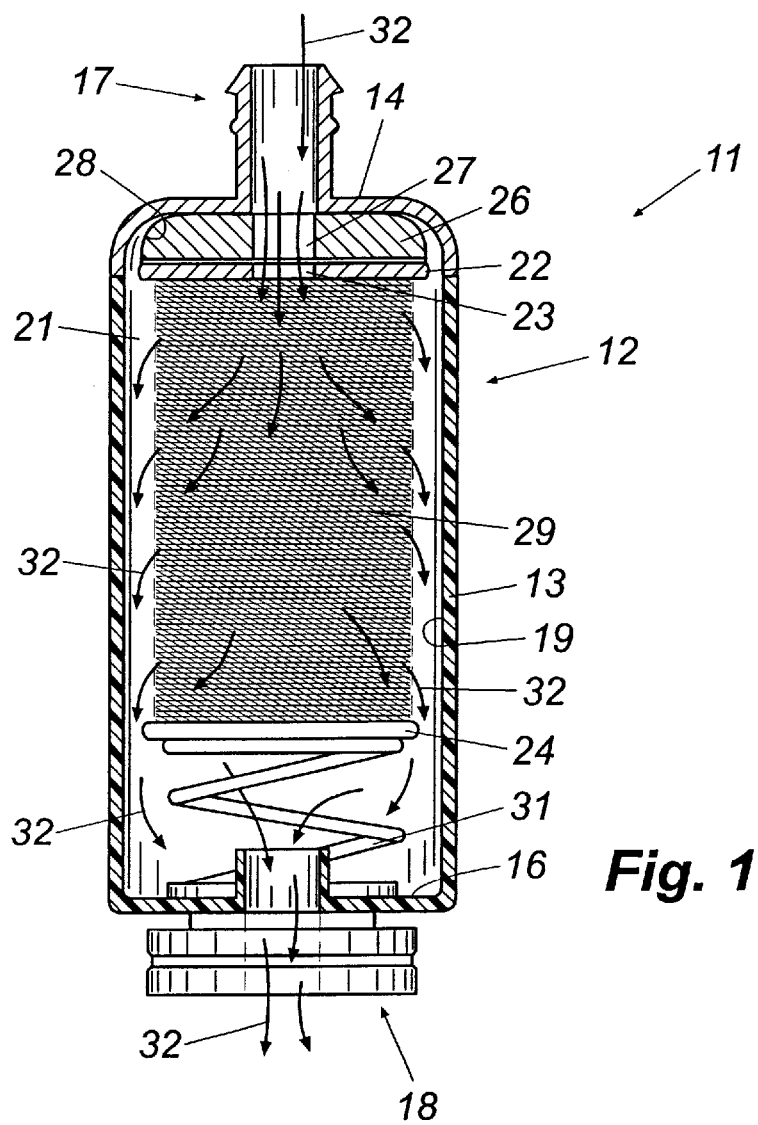
FIG. 1 is a longitudinally sectioned view of a filter unit, shown in normal operation, that embodies principles of the present invention in a preferred form.

Referring now in more detail to the drawings, in which like reference numerals refer to like parts throughout the several views, FIG. 1 illustrates a filter unit that embodies principles of the present invention in a preferred form. The primary intended use of the filter unit is for filtering automatic transmission fluid in an automobile or other vehicle and will be described herein within this context. It will be understood, however, that the filter element also may be used to filter other fluids in any situation where clogged filter bypass and removal of ferrous as well as non-ferrous particles from the fluid is required. The filter unit 11 comprises a generally cylindrical outer casing 12 having an outside wall 13, an inlet end 14, and an outlet end 16. The inlet end 14 is provided with a fluid inlet port 17 and the outlet end 16 is provided with a fluid outlet port 18. Preferably, but not necessarily, the fluid inlet and outlet ports 17 and 18 are of the well known "quick disconnect" type so that the casing 12 can be connected quickly and easily in-line with an automatic transmission fluid conduit and disconnected quickly and easily when neccessary to replace the filter unit. In the illustrated embodiment, the inlet end 14 of the casing 12 has a generally curved configuration for purposes discussed in more detail below. Further, the inlet end 14 may be formed of a ferrous metal material and may take the form of an end cap that is fitted onto the end of the side wall 13 of the casing 12.

A generally cylindrical filter element 21 is disposed within the casing 12. The filter element 21 has a first end 22 located adjacent the inlet end 14 and an opening 23 is formed in the first end 22 substantially at its center. The filter element 21 further includes a second end 24 that is located adjacent the outlet end 16 of the casing. A cylindrical wall 29 extends between the first end 22 and the second end 24 and the cylindrical wall 29 is fabricated of a substantially porous filter medium such as, for example, a small screen mesh material or an appropriate filter fabric. The diameter of the filter element 21 is less than the interior diameter of the side wall 13 of the casing 12 such that an annular space is defined between the cylindrical wall 29 of the filter element and the interior surface 19 of the casing side wall 13.

A generally annular or do-nut shaped magnet 26 is mounted at the first end of the filter element 21. The annular magnet is formed with a central opening 27 that is substantially aligned and communicates with the opening 23 in the first end of the filter element. In the illustrated embodiment, the outer or upper surface of the annular magnet is curved (as shown at 28) to match the curvature of the inlet end 14 of the casing 12 and the magnet has an outer diameter that is less than the inner diameter of the casing side wall 13. The central opening in the magnet 26 also is substantially aligned with the fluid inlet port 17 on the inlet end 14 of the casing.

With the just described configuration, it will be appreciated that, since the filter element is shorter than its surrounding casing, the filter element and the magnet mounted to its first end are longitudinally movable as a unit within the casing toward and away from the inlet end 14 of the casing and thus toward and away from the fluid inlet port 17. More specifically, the filter element and magnet are movable within the casing between an operational position (FIG. 1) wherein the magnet 26 engages and seats against the inlet end 14 of the casing, and a bypass position (FIG. 2) wherein the magnet 26 is displaced and spaced from the inlet end 14 of the casing. A coil spring 31 may be disposed within the casing 12 between the outlet end 16 of the casing and the second end 24 of the filter element. The tension and spring constant of the coil spring 31 is selected such that the spring yieldably biases the filter element 21 to its operation position with the magnet 26 seated against the inlet end 14 of the casing. In this regard, where the inlet end 14 of the casing is formed from a ferrous metal material, the seating of the magnet against the inlet end is enhanced by the magnetic attraction between the magnet and the ferrous inlet end of the casing to form a substantial seal. As an alternative, the sprig may be eliminated altogether, in which case the filter element is held in its seated position against the inlet end of the casing solely by the magnetic attraction between the magnet and the ferrous inlet end of the casing. Such an embodiment provides a particular advantage in that when the filter element becomes clogged sufficiently to overcome this magnetic attraction, it moves immediately to its bypass position, where is remains even when no fluid flow is present. Thus, the tension of the spring need not be overcome each time the transmission is operated and bypass flow is maintained at all times.

In operation, the filter unit of the present invention functions as follows when coupled in-line with an automatic transmission fluid flow conduit. Regarding operation of the filter unit, it should be noted that fluid flow through the filter unit is indicated by flow direction arrows, which are referenced by the reference numeral 32 in the figures. In its normal operational configuration illustrated in FIG. 1, transmission fluid initially flows into the filter unit through the inlet port 17. Since the magnet 26 is seated against the inlet end of the casing and since its central opening is aligned with the inlet port 17 and the opening 23 within the first end of the filter element, the transmission fluid flows from the inlet port 17, through the central opening in the annular magnet 26, and into the interior of the filter element as indicated by the flow arrows 32 in FIG. 1. As the transmission fluid passes through the central opening of the magnet 26, most of the small metallic ferrous particles that may be entrained in the flow as a result of wear within a transmission are attracted magnetically to the magnet and adhere to the inner wall of the magnet's central opening 27. In this way, ferrous particles within the fluid are removed or filtered from the fluid as it flows through the filter unit. Transmission fluid entering the interior of the filter element is thus substantially free of small ferrous particulate material.

From the interior of the filter element 21, the transmission fluid passes through the porous filter medium that forms the cylindrical wall of the filter element. The porosity of the filter medium is pre-selected such that all non-ferrous particulate matter such as dirt particles or aluminum flecks having a size large enough to damage the transmission are trapped by the filter medium and remain in the filter element. From the filter element, the transmission fluid passes into the space between the cylindrical wall of the filter element 21 and the side wall 13 of the casing 12 and moves to the bottom of the casing 12, where it exits the filter unit through the outlet port 18. Thus, in the process of traversing the filter unit 11, the automatic transmission fluid is cleaned of small ferrous particulate matter, which is removed by the magnet 26, and also of small non-ferrous particulate matter, which is trapped within the filter element 21.

After an extended period of operation, the filter medium of the filter element 21 can become clogged with particulate matter that has been filtered from the flow of automatic transmission fluid. Under these circumstances, transmission fluid can no longer flow effectively through the clogged filter element. However, restricting the flow of transmission fluid is not an option because to do so likely would damage or render the automatic transmission inoperative and, as a result, stall a vehicle in which it is installed. Thus, the filter unit of this invention incorporates an automatic bypass mode that prevents such a scenario. More specifically, if the filter element 21 of the unit becomes clogged, the pressure of the transmission fluid within the filter element increases and this increased pressure, in turn, causes a net force on the filter element tending to move it away from the inlet end of the casing. At some level, the increasing pressure and resulting force is sufficient to overcome the countervailing force of the spring 31, which normally urges the filter element toward the inlet end of the casing. At this point, the filter element and the magnet mounted to the first end thereof move away from the inlet end of the casing as illustrated in FIG. 2.

In an embodiment where the inlet end 14 of the casing is formed of a ferrous metal, the displacement of the filter element advantageously occurs quickly. This is because, even though the force caused by the increasing pressure within the filter element may exceed the bias of the spring, it still must overcome the magnetic attraction between magnet 26 and the inlet end 14 of the casing 12. When this magnetic attraction is overcome, the magnet releases quickly from the end of the casing and the filter element and magnet move instantly rather than gradually to their full bypass positions, as shown in FIG. 2. This instant transition from normal to bypass operation is advantageous for a number of reasons, including the resulting immediate restoration of full fluid flow through the filter unit and the reduction in fluid turbulence at the mouth of the filter element that can occur when this transition occurs gradually. Such fluid turbulence can stir-up trapped particulate material within the filter element causing it to be re-entrained within the flow of transmission fluid back to the transmission.

In an embodiment that omits the biasing spring, the filter element moves instantly and permanently to its bypass position when the filter element becomes sufficiently clogged to overcome the magnetic attraction between the magnet and the ferrous inlet end of the casing. This provides the advantage of greater simplicity and, since the filter element is not biased back against the inlet end by the spring when the transmission is not in operation, avoids the stirring up of particulate matter within the filter element by turbulence each time the transmission is operated.

Figure 2:
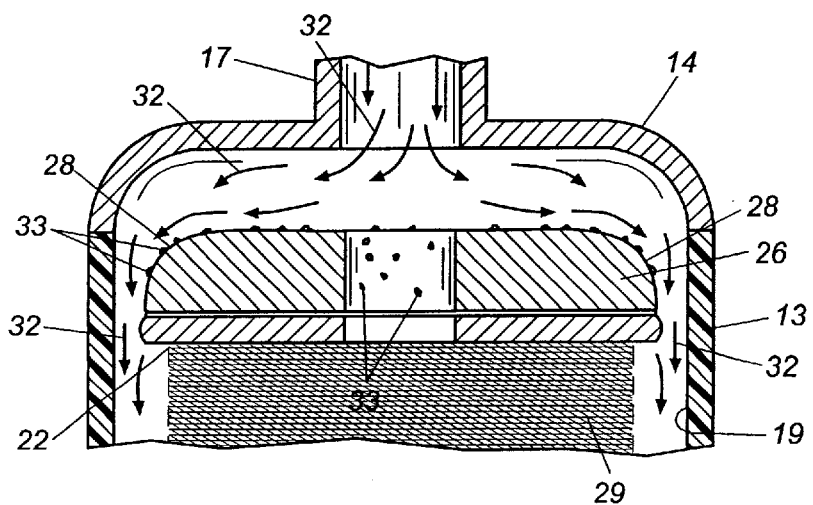
FIG. 2 is a partial longitudinally sectioned view of the filter unit of FIG. 1 in bypass mode showing fluid bypassing the clogged filter element.

In any event, when the filter element and magnet are in their bypass positions as shown in FIG. 2, transmission fluid flows into the inlet port and is diverted radially toward the side wall of the casing. From that location, the fluid flows through the space between filter element and the side wall of the casing to the outlet end of the casing, where it flows out through the fluid outlet port in the usual way. In this way, the clogged filter element itself is bypassed, which means that the small non-ferrous particulate matter entrained in the fluid is not removed. However, since the magnet 26 is mounted to the filter element and moves therewith, the bypassing transmission fluid is constrained to flow over the curved surface of the magnet before it enters the space between the filter element and the wall of the casing. As a result, small ferrous particulate matter 33 that may be entrained in the flow is still attracted to the magnet and still removed from the fluid even though the filter element is bypassed. It is important that the ferrous particulate matter continue to be removed because such particulate matter is more likely to cause damage to internal working components of a transmission than non-ferrous particles.

The mounting of the magnet 26 to the filter element 21 also has been found to have additional advantages. First, as mentioned above, it can facilitate the immediate rather than gradual transition from operational to bypass mode, which preserves fluid flow and helps prevent turbulence that might dislodge particles trapped in the clogged filter. In addition, the extra mass and extra total thickness of the opening into the filter element provided by the magnet tends further to thwart the effects of any turbulence from being transmitted into the filter element, where it can stir up trapped particles. Finally, should small ferrous particles trapped within the filter element be stirred up and attempt to pass out of the opening of the filter element, they are likely to be trapped by magnet, which attracts them to its surface, before they cay become re-entrained in the fluid flow.

The filter unit of this invention, when clogged, continues to operate in its bypass mode as described until its clogged condition is detected and the filter unit is replaced with a fresh unit. In this regard, removal and replacement is quick and easy because of the use of the quick disconnect inlet and outlet ports. The clogged filter unit is simply snapped out of the transmission line and the new filter unit snapped in. Thus, replacement can be done quickly and easily and can even be a common owner initiated maintenance item if desired.

Figure 3:
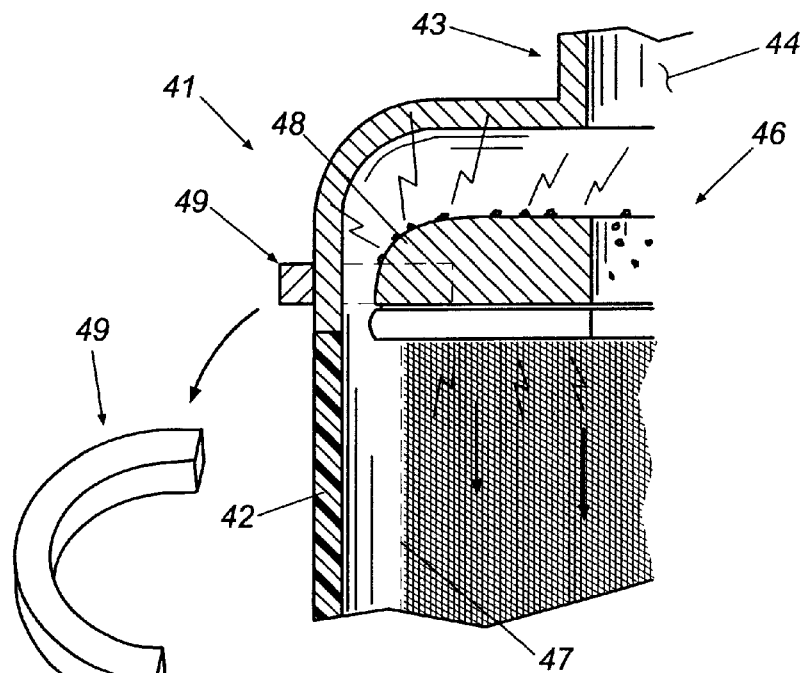
FIG. 3 is a longitudinal sectioned view of a portion of a filter unit according to the invention showing a preferred configuration and operation of the ferrous indicator flag.

FIG. 3 illustrates an enhancement of the filter unit wherein an indicator flag automatically indicates visually the presence of a clogged condition so that the filter can be replaced promptly. As with the previous embodiment, the filter unit 41 includes a casing 42 with an inlet end 43 and an inlet port 44. A filter element 46 includes a filter medium 47 and a magnet 48 and is disposed in the casing for movement toward and away from the inlet end 43 as described above. An ferrous indicator flag 49, which, in the illustrated embodiment, is generally horseshoe-shaped, is disposed on the outside of the casing 42 in the region where the magnet 48 resides when the filter element is in its normal operational position seated against the inlet end 43 of the casing. Of course, the indicator flag may take on shapes other than the illustrated horseshoe shape if desired. The indicator flag, which may be painted a bright color or may cover a brightly colored strip on the casing, is held in place against the casing by the magnetic attraction between the magnet 48 and the indicator strip. As long as the filter element is in its normal operation position, the indicator flag remains in place. However, when the filter element becomes clogged and moves away from the inlet end of the casing as described above, the magnet 48 moves away from the location of the indicator flag 48. When this occurs, the magnetic attraction between the indicator flag and the magnet is broken and the indicator flag simply falls away from the casing, as indicated in phantom lines in FIG. 3. Thus, the absence of an indicator flag on the casing serves as a visual indicator that the filter element is clogged and that replacement of the filter unit is required. Where the indicator flag covers a brightly colored strip or indicia, the falling away of the indicator flag reveals the strip as an indication that replacement is required.

Figure 4:
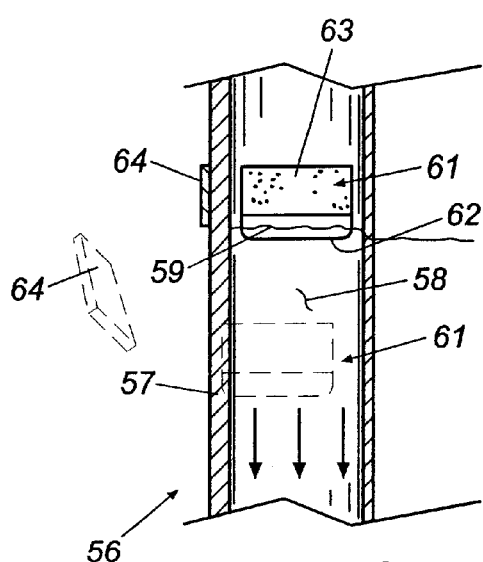
FIG. 4 is a cross section of a portion of an automotive battery illustrating application of the ferrous indicator flag to indicate spent battery fluid and thus likely battery failure.

FIG. 4 illustrates the concept of the magnetic indicator flag applied to an automotive battery. The battery 56 has a battery wall 57 behind which a battery cell 58 is located. Of course, only a small section of the battery is illustrated in FIG. 4, but it will be understood by those of skill in the art that such batteries generally have a plurality of side-by-side cells that are more or less similar. The cell 58 contains battery acid or battery fluid 59 in the usual way. A magnetic float assembly 61 is disposed in the cell 58. The magnetic float assembly 61 includes a buoyant float 62 and a magnet 63 supported on the float. As is known in the art, the buoyant float 62 is fabricated of a material that floats in battery fluid when the fluid is fresh but that sinks when the battery fluid becomes weak or spent. This occurs because as the battery fluid becomes spent and weak, its specific gravity changes in such a way that the buoyant float no longer displaces a weight of battery fluid equal to or grater than the weight of the magnetic float assembly, and the assembly sinks. A ferrous indicator flag 64 is positioned on the exterior of the battery wall 57 in the region where the magnet 61 is disposed when the magnetic float assembly is floating in the battery fluid. So long as the float assembly floats, i.e. so long as the battery fluid is fresh, the indicator flag is held to the wall 57 of the battery by magnetic attraction between the magnet and the flag. However, when the battery fluid becomes spent causing the float assembly to sink (indicated in phantom lines), the magnet 61 moves away from the ferrous indicator flag and the flag drops off the battery wall (also indicated in phantom lines). Again, the absence of the indicator flag, or the presence of a brightly colored strip of indicia covered by the flag, serves as a visual indication that the battery is almost spent and should be replaced soon.

Figure 5:
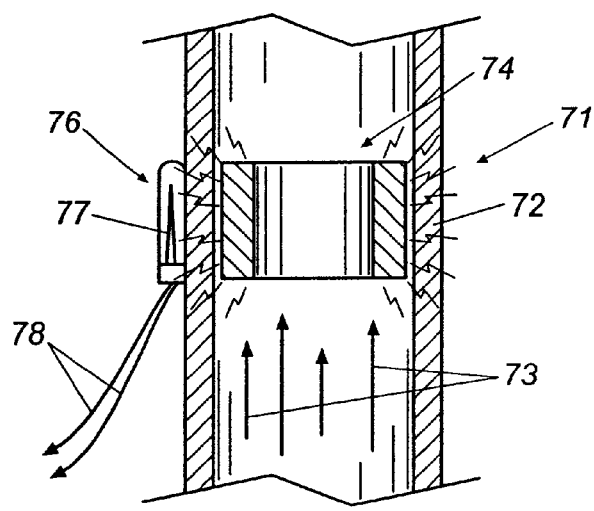
FIG. 5 is a longitudinal sectioned view of a fluid flow conduit illustrating the ferrous indicator flag technology and incorporating a magnetic reed switch in lieu of a fall-away ferrous flag.

FIG. 5 illustrates yet another application of the indicator flag technology. Here, the technology is applied to indicate when fluid flow through a conduit is greater than or less than predetermined limits. A fluid conduit 71 has a wall 72 and fluid 73, which may be a liquid or a gas, flows through the conduit. An annular magnetic ring 74 is disposed in the conduit 71. The shape of the magnetic ring and the size of its opening is predetermined such that the ring becomes suspended in the flow at a predetermined location within the conduit when the flow is moving through the conduit at a normal rate. However, if the flow becomes restricted, the ring will fall in the conduit and if the flow becomes too high, it will rise. A Hall effect switch 76, also known as a magnetic reed switch, is attached to the exterior of the conduit in the region where the magnet is suspended under normal flow conditions. The reed switch has contacts 77 and conductors 78, which may be electrically coupled to activate indicator lights when the contacts are open. Under normal flow conditions, the magnet is located adjacent the reed switch and its magnetic field keeps the contacts of the switch closed. As long as this condition persists, the indicator light is not activated. However, if the fluid flow becomes restricted or excessive, the magnet moves away from the location of the reed switch causing its contacts to open. This, in turn, activates the indicator light as a visual indication of a problem in the flow rate so that maintenance personnel may take appropriate action. This embodiment of the invention may be applied to any situation where fluid flow through a conduit requires monitoring, be it in an automotive application or otherwise. Further, the ferrous indicator flag in the embodiments of FIGS. 3 and 4 may be replaced with a reed switch as shown in FIG. 5 if activation of an indicator light is preferred to signal a failed condition.

The invention has been described herein in terms of preferred embodiments and methodologies. It will be clear to those of skill in the art, however, that various modifications may be made to the illustrated embodiments within the scope of the invention. For instance, while the filter unit preferably is cylindrical as shown, other shapes may be selected for specific purposes if desired. The curved inlet end of the casing and corresponding curved surface of the magnet is advantageous because it facilitates the seating of the magnet against the inlet end of the casing. Nevertheless, this is not a requirement of the invention and configurations different from that in the illustrations may well be selected. Finally, the magnet has been shown in the illustrated embodiments as being attached or mounted to an end cap of the filter element. As an alternative, the magnet itself may form the end cap of the filter element and, in such a configuration, the illustrated end cap naturally would not be required. These and other additions, deletions, and modifications to the embodiments illustrated and discussed herein may well be made by skilled artisans without departing from the spirit and scope of the invention as set forth in the claims.

What is claimed is:

1. A filter comprising:

a filter casing having a body portion surrounding an interior chamber, a first end wall at one end of said body portion and a second end wall at an opposite end of said body portion;

a fluid inlet port formed in said first end wall;

a fluid outlet port formed in said second end wall;

said fluid inlet port and said fluid outlet port for coupling said filter casing in-line with a fluid conduit carrying fluid to be filtered;

a generally hollow filter element disposed in said interior chamber of said filter casing;

said filter element having a first end formed with an opening and being disposed adjacent said first end wall of said filter casing, a second end disposed adjacent said second end wall of said filter casing, and a peripheral side wall formed at least partially of a filter medium and extending between said first and second ends of said filter element, said peripheral side wall surrounding an interior of said filter element;

a magnet formed with an opening and being mounted on said first end of said filter element;

said filter element being movable within said interior chamber of said filter casing between an operational position wherein said magnet engages and seats against said first end wall of said filter casing and a bypass position wherein said magnet is displaced from said first end wall of said filter casing;

said filter element, when clogged, being moved by fluid pressure from its operational position to its bypass position to allow fluid to flow around said magnet, around said filter element, and out through said fluid outlet port.

2. A filter as claimed in claim 1 and wherein said body portion of said filter casing is generally cylindrical having a diameter.

3. A filter as claimed in claim 2 and wherein said peripheral side wall of said filter element is generally cylindrical having a diameter less than the diameter of said body portion of said filter casing, a fluid bypass region being formed between said peripheral wall of said filter element and said body portion of said filter casing.

4. A filter as claimed in claim 3 and wherein said magnet is generally annular in shape and has an exterior diameter less than said diameter of said body portion of said filter casing, a bypass space being formed between said magnet and said body portion of said filter casing when said filter element is in its bypass position.

5. A filter as claimed in claim 4 and wherein said first end wall of said filter casing is formed of a ferrous material, said magnet being releasably magnetically seated against said first end wall when said filter element is in its operational position and being dislodged from said end wall to permit said filter element to move to its bypass position when said filter element becomes clogged.

6. A filter as claimed in claim 5 and further comprising a spring within said interior chamber of said filter casing for yieldably biasing said filter element toward said operational position.

7. A filter as claimed in claim 6 and wherein said spring is disposed between said second end of said filter element and said second end of said filter casing.

8. A filter as claimed in claim 1 and wherein said fluid inlet port and said fluid outlet port are configured as quick-disconnect connectors for ease of removal and replacement of said filter in-line with a fluid conduit.

9. A filter as claimed in claim 1 and further comprising a ferrous indicator flag positionable on said filter casing adjacent the location of said magnet when said filter element is in its operational position, said indicator flag being held in place on said casing by magnetic attraction to said magnet when said filter element is in its operational position and being released to fall away from said casing when said filter element and said magnet move to their bypass position, the falling away of said indicator flag indicating a clogged condition of said filter element.

10. A filter as claimed in claim 9 and wherein said indicator flag covers indicia when held in place on said filter casing and reveals the indicia as a visual indication of a clogged filter element when said filter element moves to its bypass position causing said indicator flag to fall away from said casing.

11. A filter unit for removing ferrous and non-ferrous particles from a flow of fluid through a fluid conduit, said filter unit comprising:
  a generally cylindrical casing having a first diameter, an at least partially ferrous inlet end formed with a fluid inlet port, and an outlet end formed with a fluid outlet port, said casing for being coupled in-line with the fluid conduit;
  a generally cylindrical filter element having a second diameter smaller than said first diameter and being disposed within said filter casing, said filter element having a first end formed with an opening and located adjacent said inlet end of said casing and a second end located adjacent said outlet end of said casing;
  a generally annular magnet having a third diameter less than said first diameter and being mounted to said first end of said filter element, said magnet having an opening substantially aligned with said opening formed in said first end of said filter element;
  said filter element being movable within said casing between an operational position wherein said magnet is magnetically held and seated against said at least partially ferrous inlet end of said casing for fluid flow through said opening in said magnet and into said filter element, and a bypass position wherein said magnet is displaced from said inlet end of said casing for fluid flow around said magnet and around said filter element;
  said filter element, when clogged, producing fluid pressure sufficient to disengage said magnet from said inlet end of said casing permitting said filter element to move to its bypass position allowing fluid to bypass the clogged filter while continuing to pass over and around the magnet for continued trapping of ferrous particulate matter.

12. A filter unit as claimed in claim 11 and further comprising a spring is disposed between said second end of said filter element and said outlet end of said casing to urge said filter element yieldably against said inlet end of said filter casing.

13. A filter unit as claimed in claim 11 and wherein said fluid inlet port and said fluid outlet port are quick-disconnect ports for ease of removal and replacement of said filter unit.

14. A filter unit as claimed in claim 11 and wherein said magnet form s said first end of said filter element.

15. A filter unit claimed in claim 11 and further comprising an indicator flag positionable on said filter casing adjacent the location of said magnet when said filter element is in its operational position, said indicator flag being held in place on said casing by magnetic attraction to said magnet when said filter element is in its operational position and being released to fall away from said casing when said filter element and said magnet move to their bypass position, the falling away of said indicator flag indicating a clogged condition of said filter element.

16. A filter unit as claimed in claim 15 and wherein said indicator flag covers indicia when held in place on said filter casing and reveals the indicia as a visual indication of a clogged filter element when said filter element moves to its bypass position causing said indicator flag to fall away form said casing.

17. In a filter unit having a cylindrical casing that houses a cylindrical filter element movable within said casing between an operational position wherein fluid flows through said filter element and a bypass position wherein fluid bypasses said filter element, and a magnet having an opening though which fluid flows to trap ferrous particulate matter within the fluid, the improvement comprising wherein the magnet is mounted to and moves with the filter element such that when said filter element is in the operational condition the magnet is seated against an inner surface of the casing and such that when said filter element is in its bypass position fluid flows around said magnet for continued trapping of ferrous particulate matter within the fluid as the fluid bypasses said filter element.

18. The filter unit of claim 17 and wherein said casing has an inlet end provided with an inlet port and an outlet end provided with an outlet port and wherein said filter element has a first end adjacent said inlet end of said casing, and wherein said magnet is mounted at said first end of said filter element with its opening substantially aligned with said fluid inlet port for flow of fluid through said opening in said magnet into said filter element.

19. The filter unit as claimed in claim 18 and wherein said magnet forms said first end of said filter element.

20. The filter unit as claimed in claim 18 and wherein said first end of said filter element is formed by a generally annular disc and wherein said magnet is mounted on said disc.

21. The filter unit as claimed in claim 17 and further comprising a spring mounted in said casing for yieldably biasing said filter element to its operational position.

22. The filter unit as claimed in claim 17 and wherein at least a portion of said casing is formed of ferrous material and wherein said magnet is releasably magnetically seated to said casing when said filter element is in its operational position.

23. A filter unit for filtering ferrous and non-ferrous particulate matter from a flow of automotive transmission fluid, said filter unit comprising a cylindrical casing having an inlet end provided with an inlet port and an outlet end provided with an outlet port, said casing for coupling in-line with a transmission fluid conduit, a cylindrical filter element having a side wall formed of a filter medium for filtering non-ferrous particulate matter, a first end with an opening adjacent said inlet end of said casing, and a second end adjacent said outlet end of said casing, said filter element being movable within said casing toward said inlet end of said casing to an operational position and away from said inlet end of said casing to a bypass position, an annular magnet mounted at said first end of and movable with said filter element, said annular magnet being seated against said inlet end of said casing when said filter element is in its operational position for fluid flow through said magnet and into said filter element and being displaced from said inlet end of said casing when said filter element is in its bypass position for fluid flow around said magnet and around said filter element when said filter element is in its bypass position, and a spring disposed between said second end of said filter element and said outlet end of said casing for yieldably biasing said filter element to its operational position, said filter element, when clogged, being moved by fluid pressure to its bypass position with said magnet continuing to trap ferrous particulate matter within said transmission fluid and inhibiting disturbed particulate matter within said clogged filter element from moving out of said filter element.

* * * * *